United States Patent [19]

Corwin

[11] 4,001,549
[45] Jan. 4, 1977

[54] MARKING DOCUMENT AND TEMPLATE ASSEMBLY AND METHOD OF MAKING THE ASSEMBLY

[76] Inventor: Edward J. Corwin, 200 Central Park South, Apt. 15B, New York, N.Y. 10019

[22] Filed: May 26, 1972

[21] Appl. No.: 257,298

Related U.S. Application Data

[63] Continuation-in-part of Ser. No. 151,676, June 10, 1971, abandoned.

[52] U.S. Cl. .................. 235/61.12 R; 235/61.12 N
[51] Int. Cl.² .......................................... G06K 19/06
[58] Field of Search ............ 235/61.12 R, 61.12 C, 235/61.12 M, 61.12 N; 35/48, 26

[56] References Cited
UNITED STATES PATENTS

| | | | |
|---|---|---|---|
| 2,525,837 | 10/1950 | Simplair | 235/61.12 C |
| 2,535,125 | 12/1950 | Ferry | 235/61.12 R |
| 2,873,545 | 2/1959 | Noel | 35/26 |
| 2,964,374 | 12/1960 | Miller | 35/48 B |
| 3,576,430 | 4/1971 | Fickenscher et al. | 235/61.12 N |
| 3,602,696 | 8/1971 | Joyce | 235/61.12 R |
| 3,610,893 | 10/1971 | Clark et al. | 235/61.12 R |
| R23,385 | 7/1951 | Knutsen | 235/61.12 N |

*Primary Examiner*—Daryl W. Cook
*Attorney, Agent, or Firm*—Sughrue, Rothwell, Mion, Zinn & Macpeak

[57] ABSTRACT

An optically scannable document having columns of marking areas thereon where the vertically adjacent marking areas in a column are horizontally staggered. Also, a template for the document and having columns of horizontally staggered marking openings therein corresponding to the marking areas on the document. The horizontal staggering arrangement assures that an unskilled user will make a sufficiently long mark in the marking area on the document so that the mark can be scanned by commercially available optical scanning equipment. Furthermore, the staggered openings in the template assure the structural strength of the template. Also, a template assembly including the template and a base plate designed to hold the document and accurately align it with the template. Also, a method of mass-producing the template assemblies.

3 Claims, 20 Drawing Figures

MARKING DOCUMENT AND TEMPLATE ASSEMBLY AND METHOD OF MAKING THE ASSEMBLY

CROSS-REFERENCE TO RELATED APPLICATION

This application is a continuation-in-part of application Ser. No. 151,676, filed by applicant on June 10, 1971, now abandoned.

BACKGROUND OF THE INVENTION

1. Field of the Invention

The invention relates generally to the field of optically scannable documents and templates therefor, and, more particularly, to a novel arrangement of marking areas on the document and the corresponding novel arrangement of openings in the template, and also to a novel template assembly for holding the document and to a method of making the assembly.

2. Description of the Prior Art

In the prior art, the marking openings in the columns of a card marking template have been mostly horizontally-extending openings, for example, as shown in U.S. Pat. No. 2,525,837 issued Oct. 17, 1950. The resulting horizontal or slanted marks on the card which were used for electrically conductive mark-sensing, are not optically readable by commercially available more recent optical mark readers, such as IBM type 2501, 2502 or 3505. These readers require vertical marks. Using vertical openings for adjacent marking positions in a template of prior art is not feasible since the mark itself must be 0.170 inch long and the openings must extend at least 0.050 inch on each side of the mark to assure that good marks are made even with a dull pencil.

Since the distance between the centers of two adjacent vertical marks is 0.250 inch, adjacent vertical openings would overlap and instead of individual openings for each mark, they would form one continuous slot.

Although horizontal, as well as slanted marks can be optically read by a more expensive, older, IBM type 1287 optical scanner they would require a template with widely spread out columns of openings in order to provide sufficient strength of said template and minimize errors.

SUMMARY OF THE INVENTION

The broad object of the invention is to provide an improved template and optically scannable marking document which can be used by an unskilled person with accuracy.

Another object of the invention is to provide a template with openings arranged in such a manner that the template is structurally strong while at the same time using a minimum horizontal spacing for each usable column of openings.

A more specific object of the invention is to provide a template having a plurality of closely-spaced columns of marking openings therein, with vertically adjacent ones of the openings being horizontally staggered with respect to each other.

Another object is to make the staggered marking openings vertically extending.

Another specific object of the invention is to provide a marking document for use with such a template and having horizontally staggered, marking areas corresponding to the staggered openings in the template.

Another object is to make the staggered marking areas vertically extending.

Still another object of the invention is to provide a novel template assembly including a template and a base member including means for accurately aligning the document card marking areas with respect to the openings in the template.

Another object is to provide an improved method and system for massproducing the template assemblies.

BRIEF DESCRIPTION OF THE DRAWINGS

FIGS. 13 and 14 are plan views of two additional embodiments of the template assembly.

DESCRIPTION OF THE PREFERRED EMBODIMENTS

Figure 1:
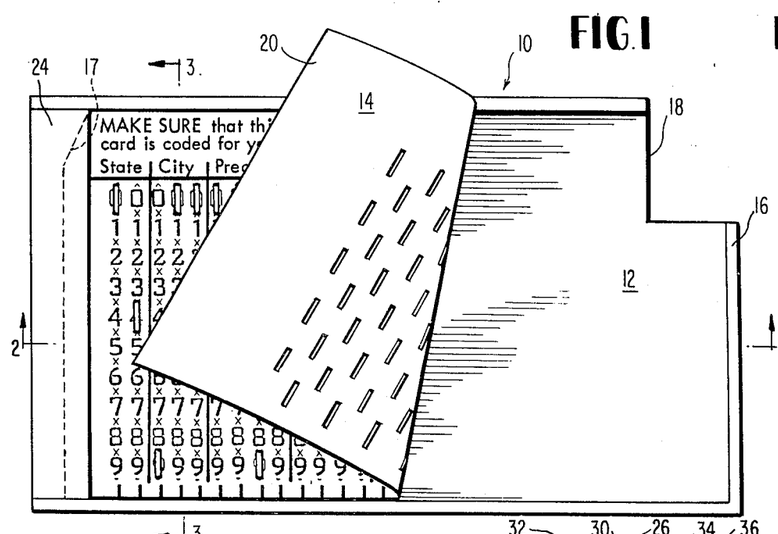
FIG. 1 is a plan view of a preferred embodiment of the novel template assembly.

FIG. 1 illustrates a preferred embodiment of a novel template assembly 10 comprising a base member 12 and a template 14.

The base member 12 has a rim 16 formed therein and extending around most of the periphery of the base member to form a cavity corresponding to the shape of an IBM document card which is 3¼ inches high. The base member has a notch 18 formed in the upper right-hand corner thereof, and corresponds to the upper right-hand corner 20 of the template 14. There is no rim around the notch. The rim 16 is shown more clearly in the sectional views illustrated in FIGS. 2 and 3. As shown more clearly in FIG. 2, the rim portion 22 extending transversally along the hinged end of the base member 12 is wider than the other portions of the rim 16.

Both the base member 12 and the template 14 are preferably made of a moldable or vacuum formable, heat-sealable plastic material, even though the base member and the template 14 may be made of other materials. A hinge is formed between the template 14 and the base member 12 by applying a heat-sealable or adhesive plastic strip 24 in such a manner that it engages both the widened rim portion 22 and a portion of the end of the template 14. Suitable heat and pressure are then applied to the strip so that it adheres to both the template and the rim portion, whereby the strip 24 joins together the rim portion 24 and the template 14 to form a flexible hinge for the template assembly.

Figure 4:
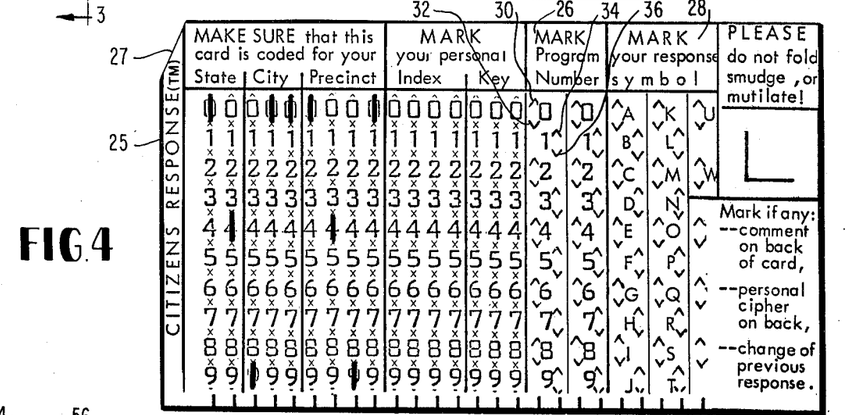
FIG. 4 is a plan view of a preferred embodiment of the novel marking document.

FIG. 4 illustrates a standard 3¼ inch high IBM card 25 designed for scanning by an IBM type 1287 optical scanner and having novel marking areas arranged thereon in accordance with the principles of this invention. The card contains several fields of columns of marking areas and corresponding indicia, but the fields 26 and 28 are of primary interest with respect to the invention. Field 26 contains two columns of numerical indicia 0, 1, 2 . . . 8, 9. In order to describe the advantage of the present invention, we will look at, as an example, only at the left-hand column of indicia in field 26. On the left side of the numeral 0, there are vertically-spaced marks 30 and 32 which define a vertically-extending marking area which is to be marked by the user with a pencil, for example. The vertical spacing between the marks 30 and 32 indicate the outer extremities of the vertical mark which should be placed in the marking area in order to assure that the mark is readable by conventional optical mark reading equipment.

It can be seen that, if the marking area for the next vertically adjacent numeral 1 were disposed immediately below that for the numeral 0, the two marking areas would touch each other, and that the marking areas for the 0 and the 1 would be so close to each other that a person marking the 0 marking area, for example, might inadvertently extend his mark into the marking area for the numeral 1. However, according to my invention, the marking area for the numeral 1 is defined by markers 34 and 36, disposed horizontally adjacent to the right-hand side of the numeral 1. In other words, the marking area for vertically adjacent indicia in the column are horizontally staggered with respect to each other. This same staggering arrangement can be observed for the other indicia in the column and also for the other indicia columns in card fields 26 and 28.

Even though, in effect, two potential columns on the document are utilized to provide the marking areas for one vertical column of indicia, because of the use of vertical marking areas as opposed to the slanted and horizontal marking areas of the prior art, the total card width required for the two columns of marking areas when scanned by an IBM type 1287, is only 0.280 inch. The field 28 of the document 25 contains alphabetical indicia rather than numerical indicia, but the horizontal staggering of the marking areas for vertically adjacent alphabetical characters is the same as in the numerical field 26.

The horizontal staggering of the marking areas in fields 26 and 28 is important, because in the proposed audience communication system in which the document is designed to be used, it is possible that vertically adjacent marking areas would be marked. However, in the other fields of the document, the horizontal staggering of the marking areas is not required since the information represented by the indicia is such that two vertically adjacent marking areas are never marked.

Figure 5:
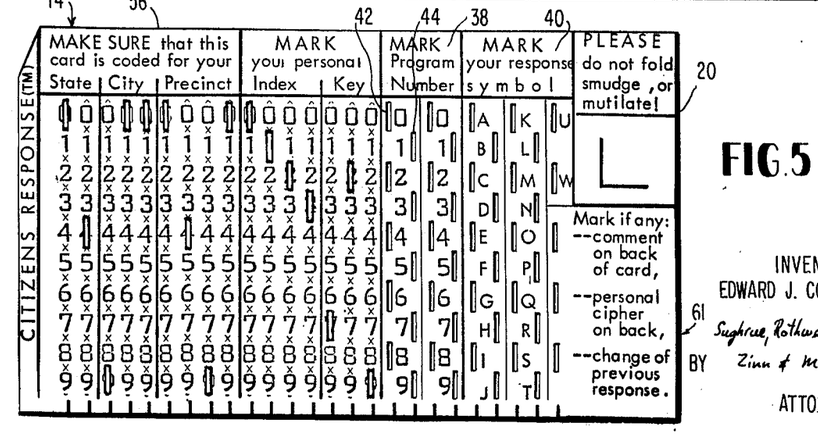
FIG. 5 is a plan view of a preferred embodiment of the novel template.

FIG. 5 illustrates a preferred embodiment of the template 14 which is shown in FIG. 1 as a part of the template assembly 10. Even though the template has several vertical fields, the fields of primary importance to this invention are fields 38 and 40 which correspond to the fields 26 and 28, respectively, on the document 25 illustrated in FIG. 4.

Again, as an example, we will look at the left-hand column of indicia 0, 1, 2 . . . 8, 9 in field 38. One set of vertically-extending marking openings is located horizontally adjacent the left-hand side of the evennumbered indicia, and another set of such openings are located horizontally adjacent the right-hand side of the odd-numbered indicia. That is, the marking openings for vertically adjacent indicia are horizontally staggered with respect to each other.

More specifically, when template 14 is properly aligned with the document 25, marking openings 42 and 44 overlie and are aligned with the vertically extending marking areas defined by marks 30, 32 and 34, 36, respectively, on the document illustrated in FIG. 4. The vertical marking areas for the template field 40 are also horizontally staggered relative to the three columns of alphabetical indicia.

If the vertical openings in template 14 were not staggered, but instead were placed one beneath the other, they would form a continuous slot in the template, thereby resulting in a structurally weak card and also increasing the likelihood that a mark made in one marking area of the document would inadvertently extend into a vertically adjacent marking area, thereby causing an error upon readout.

Figures 2, 6, 7:
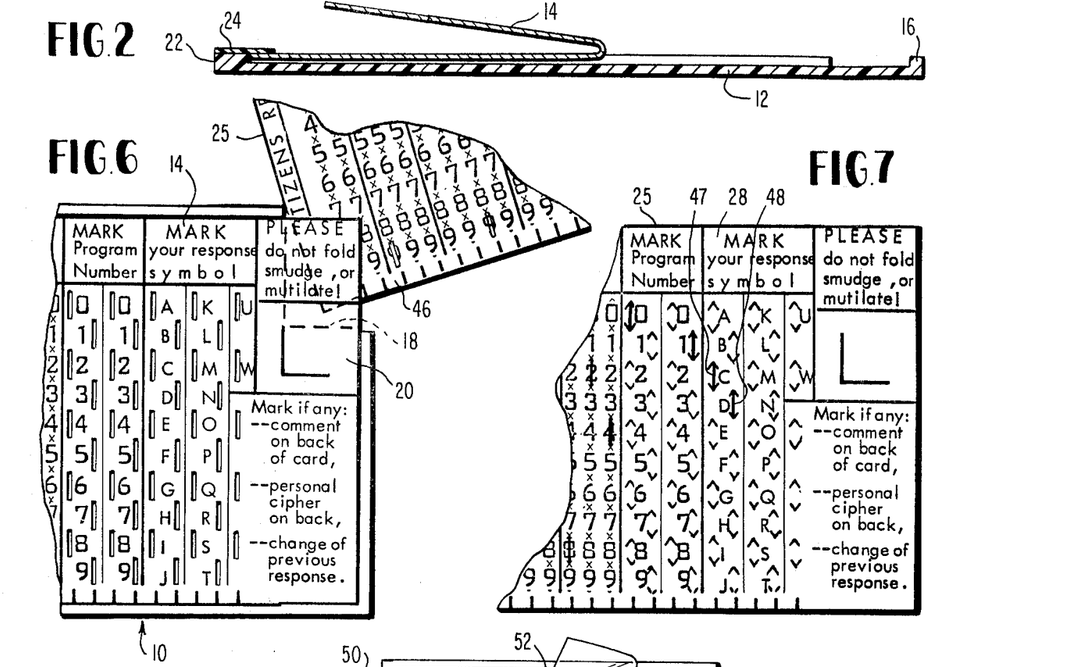
FIG. 2 is a sectional view taken along line 2—2 of FIG. 1.
FIG. 6 is a fragmentary view illustrating the manner in which a marking document is inserted into the template assembly illustrated in FIG. 1.
FIG. 7 is a fragmentary view of a document after marking.
Figure 3:
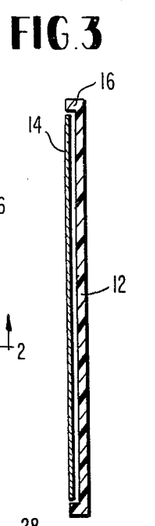
FIG. 3 is a sectional view taken along line 3—3 of FIG. 1

FIG. 6 illustrates the manner in which a document 25 is easily inserted in the novel template assembly 10 illustrated in FIG. 1. The lower left corner 46 of the card is inserted into the notch 18 of the base member 12 and under the upper right corner of the template 14 so that the template may be easily lifted by the document to permit the document to be inserted into the template assembly.

The document 25 fits into this cavity formed by rim 16 and rim portion 22 so that the marking openings in the template 14 are aligned with the marking areas on the document. The rim portion 24 (See FIG. 1) has a slanted portion 17 which mates with diagonally cut corner 27 of the document 25 (See FIG. 4). A mark then may be accurately made on a desired area of the document by inserting a pencil through the corresponding opening in the template.

It is also contemplated that the novel template 14 be used alone, i.e. not as a part of the novel template assembly 10, by placing it over a document and aligning the template openings with the corresponding marking areas on the document.

FIG. 7 is a fragmentary view of the document 25 illustrated in FIG. 4 showing two typical optically scannable pencil marks 47 and 48, which have been made on the document field 28 by the use of the template 14 illustrated in FIG. 5.

Figures 8, 9:
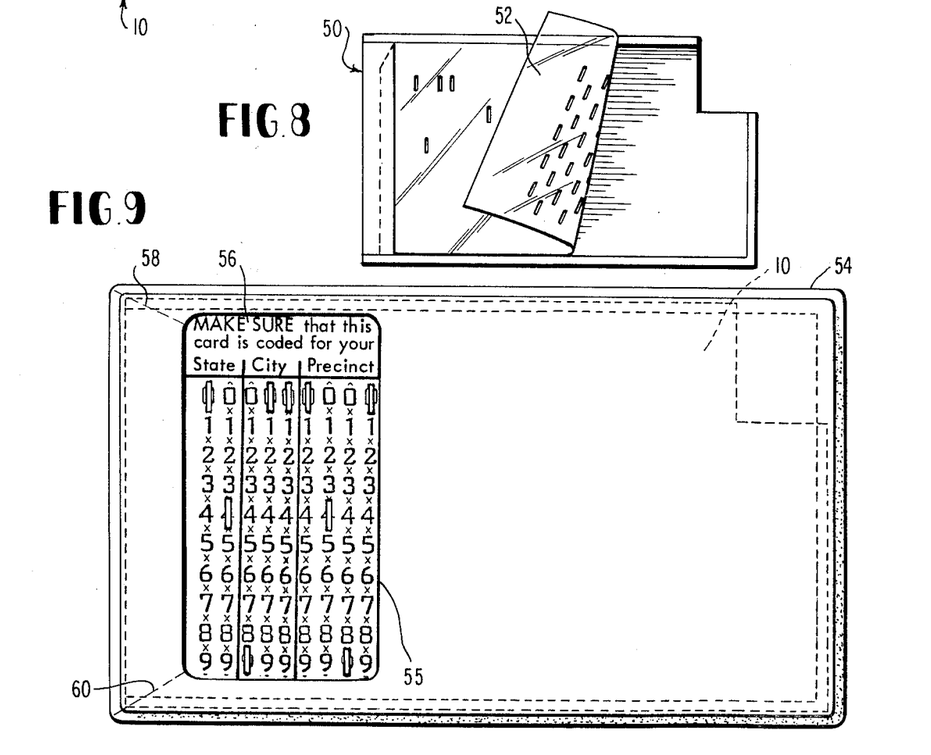
FIG. 8 is a plan view of another embodiment of the template assembly illustrated in FIG. 1.
FIG. 9 illustrates the template assembly of FIG. 1 in a windowed envelope.

FIg. 8 illustrates another embodiment of the invention wherein a template assembly 50 has a transparent template 52 rather than the opaque template 14, as illustrated in FIG. 1. In this form of the invention, the indicia and other instructions need not be printed on the template 52, since, when a document is inserted into the template assembly, the printing on the document is visible through the transparent template.

FIG. 9 illustrates a windowed envelope 54 containing a template assembly 10 in the manner in which it would be received by a subscriber to the audience communication system for which the template assembly and document described above are particularly useful. The window 55 is positioned and shaped such that the user's area field 56 is visible through the window.

The envelope 54 has two perforated tear lines 58 and 60 extending from the left-hand corners of the window 55 to the nearest corners of the envelope. This arrangement permits a person to easily open the envelope by inserting his fingers under the portion of the envelope to the left of the window and tearing open the envelope to remove the template assembly. The state, city and precinct portions of the area field 56 are provided with vertical marking openings in the appropriate positions so that a sealed envelope containing the template assembly may be sent to distribution centers where the geographical area for which the template is designed may be easily determined without opening the envelope. Of course, it is to be understood that the precinct may be replaced by another area-identifying code, such as the postal zip code, and the tract number used by the Census Bureau.

Thus, it can be seen that I have invented a novel template assembly and a novel optically scannable document for use with the template assembly. The novel template assembly permits a non-skilled user to mark the document marking areas so that marking errors are eliminated. As pointed out above, in order for a mark on a document to be scanned by commercially available optical mark scanners, the marks must be of a certain minimum vertical length, as indicated, for example, by the markers 30, 32 and 34, 36 in FIG. 4. It can be seen that, if the marking area for the indicia in a column such as the left-hand column in section 26 in FIG. 4 were located one below the other, the vertical openings in the template would run together and form one continuous vertically-extending slot in the template. With such an arrangement, the person using a pencil to mark the marking areas on the document beneath the template could very easily permit the pencil mark from one marking area to extend into the vertically adjacent marking area, thereby causing a readout error when the document is optically scanned. By contrast, horizontal staggering of vertically adjacent template openings do in effect provide two vertical columns of template openings for each column of indicia eliminating the possibility of error in marking the document. Furthermore as previously explained, the use of these staggered template openings results in a structurally strong template while at the same time keeping to a minimum the horizontal distance between columns as well as at the same time meeting the requirements of the commercially available optical mark reading equipment. The minimum length required for a mark to be optically sensed is 0.140 inch on an IBM type 1287 and 0.170 inch on more recent IBM readers. Tests have shown that the template openings must then be 0.240 inch long for an IBM type 1287 and 0.270 inch for more recent IBM types.

The document itself may be of any form or weight of paper or plastic acceptable for mark reading. Furthermore, even though in the preferred embodiment, as shown in FIG. 4, the state, city, and precinct fields are shown to be premarked, this information could instead be punched in the card document by standard card punching equipment. Since the documents are prepared in batches for each distribution area, this prepunching method is more flexible and economical than the preprinting of marks. The main advantage is that prepunching could be done as the need arises, using a master card. On the contrary, if premarking rather than prepunching is used, it could make the marking or printing operation less economical, since the batches must be larger, thereby causing a possible storage problem. In addition, the printing of premarked area will require very exact registration, which in turn demands substantial setup time. A document containing only marks either preprinted or inserted by the user can be read by commercially available machines, such as the IBM type 1287 optical scanner. If the area portion of the document card is prepunched rather than preprinted, IBM type 2501, 2502 or 3505 readers with optical mark recognition feature can be used to read in one operation the punched holes from these columns and also the optical marks from the other columns.

The proposed audience communication system can be used for obtaining an input from a very great number of individuals for applications such as opinion polls, elections, accounting servies, mail ordering, etc. The template openings in the index and key sections of the document 14 are unique to a particular user. The computer associated with the optical reading equipment will recognize only the first response for a particular personal index and key. However, a user may change his response by marking the change symbol on another document through the change opening in the functional field 61 of the template 14 illustrated in FIG. 5. The computer would then recognize the second response as a valid change in response and would adjust and update all results in the computer system memories, and also enter into periodic accumulations indicating the types and volumes of response changes. The provision of the personal security code in the form of the index and key number is an important feature of the template 14. After the marked documents are processed, a print-out of the responses in sequence by the personal index and key is made available at distribution centers and allows any user of the document to easily and secretly verify his reponse on the print-out sheet.

The template assembly and documents described are particularly suited for a television audience response system where a subscriber receives in the envelope 54 shown in FIG. 9 his template or template assembly having his area field and his personal index and key sections prepunched with template openings. The subscriber already knows his area identification so that he can verify the validity of his template. He is also informed that no one else in his area has the same personal index and key number, and no one else knows what his number is. For example, when the subscriber is viewing a television program, the television announcer would indicate that the subscriber should mark program no 01, for example (see FIG. 7), and mark one of the response symbols A, B or C, for example, as his response to a first question. The user may then be instructed, for example, to mark one of D, E, F, G or H for another question. Then he would verify the prepunched or premarked area field and mark his index and key. The marked document is then mailed to a processing center and each document contains all the necessary informations, i.e. the geographical area of the country, the unique personal index and key for the particular subscriber, the particular television program involved, and the subscriber's responses to the specified questions.

Use of a special code to permit a subscriber to change his previously entered response on a first document is important since it permits a determination of the degree of change of public opinion caused by the impacts of various events such as domestic, foreign, political and military speeches and other events.

It is contemplated that response will be accumulated over a period of a year so that responses and changes in responses are continuously accumulated in the computer. In order to keep the response to public opinion questions current, it is contemplated that computer memories will be cleared at the end of a predetermined time, for example, at the end of a year, so that the accumulated response to a particular question is always fresh.

Even though a short IBM card has been illustrated, it is to be understood that a document of any size could be used. For example, an IBM 80-column card would provide additional marking spaces allowing on one card responses to more than one program. The documents scannable by other readers can be even larger. Of course, the template and/or template assembly would then be designed to match the particular document being used.

Figures 10, 11A:
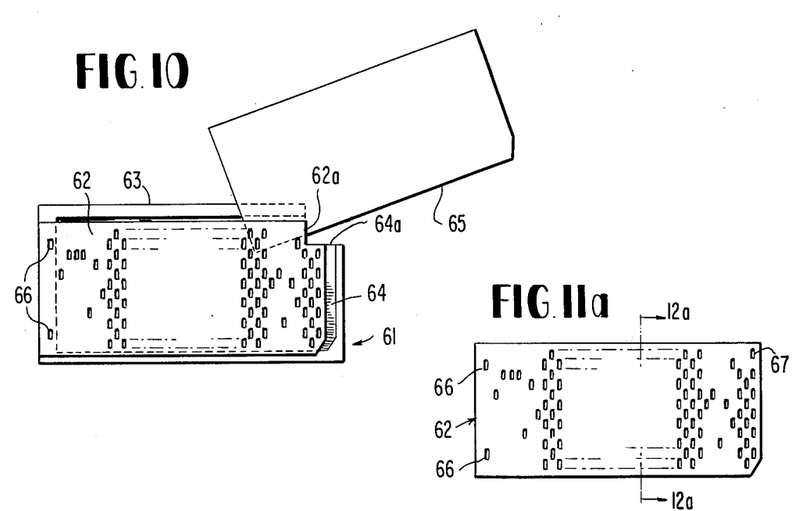
FIG. 10 is a plan view of another preferred embodiment of the template assembly.
FIGS. 11a, b and c are plan views of the individual elements of the assembly.

FIG. 10 illustrates another preferred embodiment of the invention wherein a template assembly 61 is in the form of a jacket or pocket open on two sides. The template 62 may be of any size to accommodate marking documents designed for various Optical Mark Reading machines, including IBM Type 3505, which reads standard card sizes, and IBM Type 3881, which reads various sizes of forms. Template 62 is bonded along two edges to the frame 63 which in turn is bonded to the base 64. The base may be opaque to insure the secrecy of the personal index and key code.

As shown in FIG. 10, template 62 is shifted with respect to the frame 63, thus leaving open spaces between the two unbonded edges of the template and the two free inside edges of the frame. This arrangement not only results in a sturdy assembly, easy to handle and easy to mail, but most importantly it facilitates the insertion of the marking document 65 between the template 62 and the base 64. The inside of the frame 63 has an outline corresponding exactly to the size and the shape of the marking document. The frame 63 of the template assembly 61 thus performs that same positioning function as the rim 16 shown in FIGS. 1, 2, and 3 of my patent pending illustrating another embodiment of my invention. Therefore, once fully inserted, the document 65 will fall into the frame 63 so that its marking areas and/or holes will become exactly positioned with respect to the corresponding apertures in template 62.

The corner 62a of the template 62 opposite the bonded edges is cut out to facilitate the removal of the document 65 from the template assembly 61. This corner is identical to the corner 64a of the base 64, and therefore, may be cut out in the same operation after the entire template assembly 61, consisting of the base, frame and template, has been bonded.

Although the frame 63 and the base 64 could be molded or vacuumformed, as described above with respect to base member 12 and rim 16, the maintenance of the tolerances required makes such a process very difficult.

Figures 11B, 11C, 13, 14:
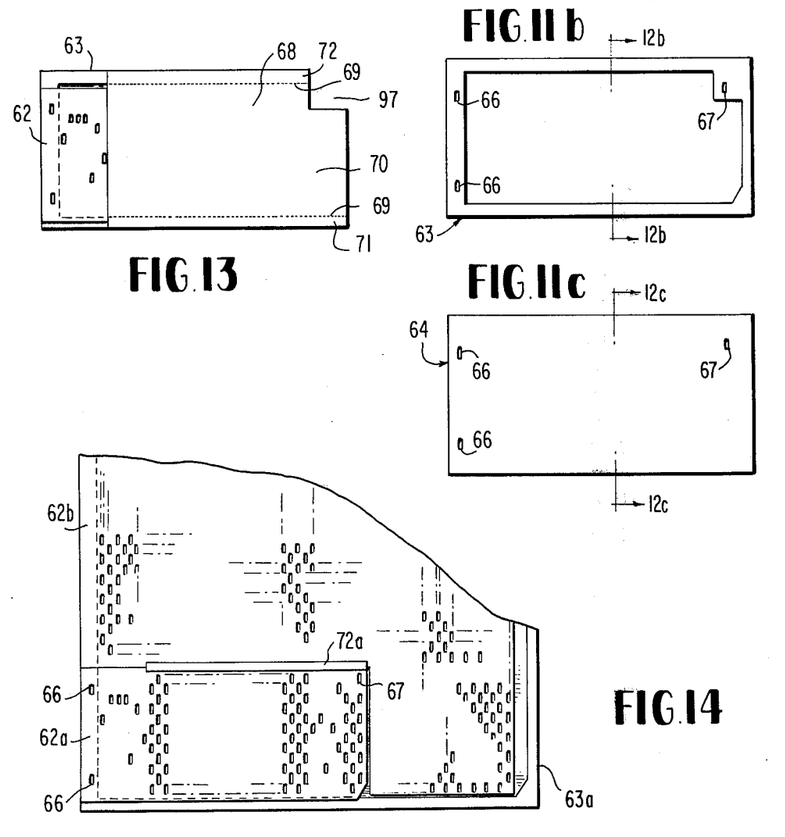

I therefore have invented an improved manufacturing process in which the template assembly is formed by bonding together the template 62, the frame 63, and the base 64, each of which is cut out of sheet plastic or paper and are shown as separate elements in FIGS. 11a, 11b and 11c, respectively. To assure perfect alignment of these parts, each of them has two positioning slots 66 in the bonded areas shown in FIGS. 10 and 11, and one slot 67 in a corner which will be cut out after bonding, shown on FIG. 11. These positioning slots correspond to guide pins in a fixture which may be used to manually assemble the parts to form the template assembly.

Figure 12A:
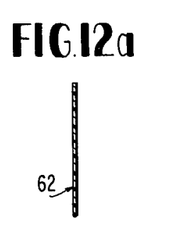
FIGS. 12a, b and c are cross-sectional views taken along lines 12a, 12b and 12c in FIGS. 11a, 11b and 11c, respectively.
Figure 12B:
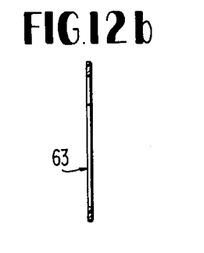
Figure 12C:
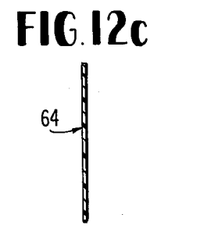

FIGS. 12a, 12b and 12c are sectional views of the elements as taken along lines 12a, 12b and 12c of FIGS. 11a, 11b and 11c, respectively.

If secrecy of the personal and confidential index and security key is required, an opaque plastic or paper cover 68 is bonded to the free edge of the frame 63 and the opposite edge of the template 62 in a manner as shown in FIG. 13. This cover obstructs the view of the index and key codes, but leaves open the location codes, such as, for instance, state, city and precinct, or zip code and U.S. Census Tract code. Location codes embodied in a template must remain visible to permit issuance of a template to a citizen based on his residence location. The cover 68 has horizontal perforations 69 which facilitate ripping off the main portion 70 of the cover 68 by the user. The two outside strips 71 and 72 will remain bonded to the template assembly 61.

The template 62 prior to bonding is perforated with reference codes and marking pattern slots. If the template has the shape of an IBM card, a very practical way is to use an IBM high-speed punch, such as IBM Type 2540 or 3525. These machines can punch variable codes and patterns generated by computer tape individually for successive templates as they travel through the punch. Such patterns also include the positioning holes 66 and 67 described above. The bottom outside strip 71 of the cover 68 may overlap the bottom portion of the template 62 and remain bonded to it, as well as being bonded to the bottom portion of the frame 63, thus joining these parts to form the bottom junction of the template assembly 61.

A template assembly designed for large marking documents, such as used with IBM Type 3381, is shown in FIG. 14, and may contain a template 62a with reference codes as described above. This template may be the size of an IBM card and may be produced by data processing punches. The assembly also may contain a general template 62b prepunched with an allpurpose marking pattern, identical in all such general templates used with a particular document. The reference code template 62a and the general template 62b may be bonded to the frame 63a, and the top outside strip 72a of the cover 68 may be used be join the two adjacent edges of both templates. In this embodiment, the notch in the upper right corner of the template 62a is not required.

Figures 15, 16:
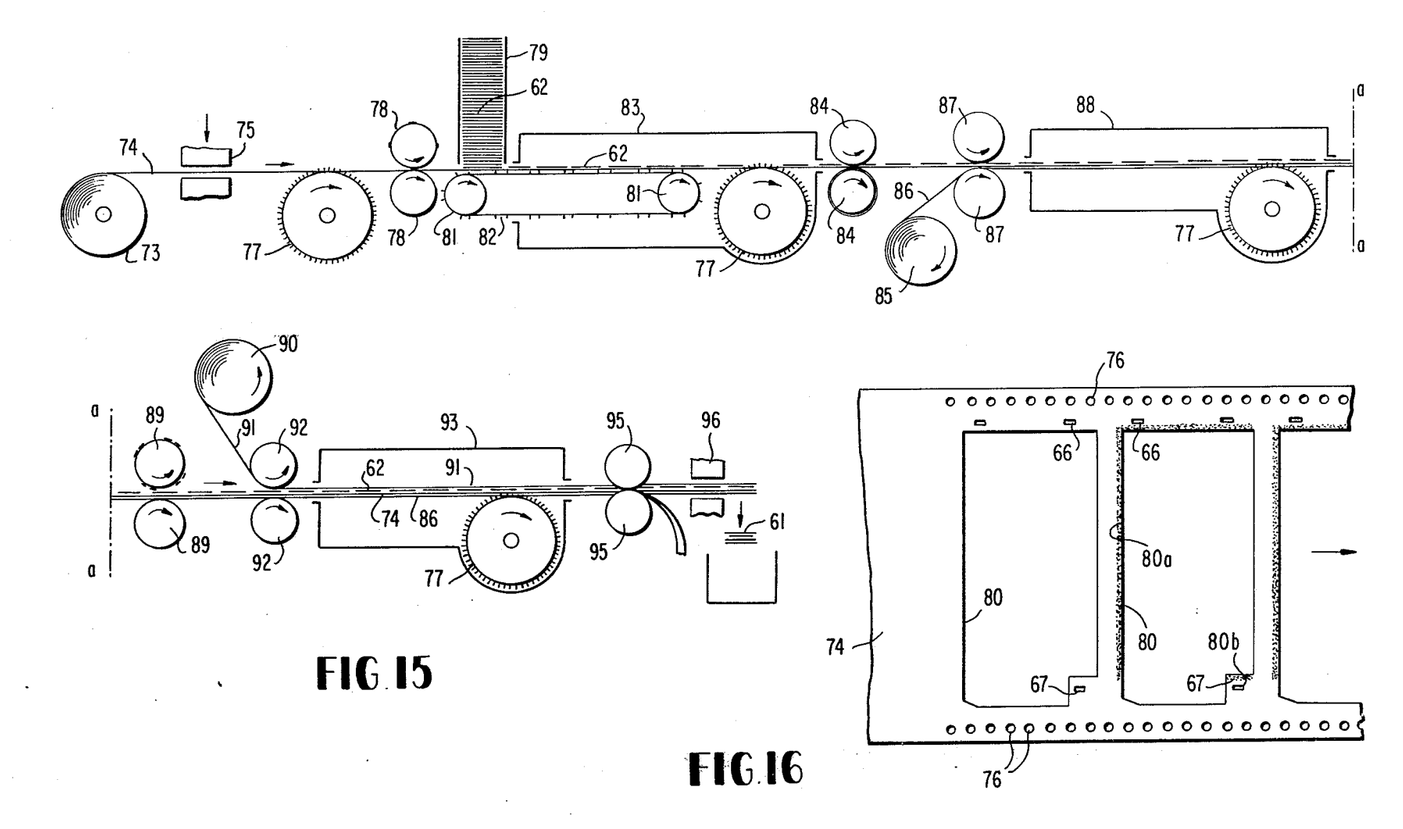
FIG. 15 is a diagrammatic view showing a novel system and method for mass-producing template assemblies.
FIG. 16 is a plan view showing the result of the first step of the system illustrated in FIG. 15.

For very large volumes, the manufacturing of the template 61 could be effected automatically as shown in FIG. 15.

A roll 73 feeds a plastic or heavy paper sheet frame ribbon 74 into a punching station 75 which punches out of the ribbon the opening 80 of the frame 63, the positioning slots 66 and 67, and two parallel rows of traction or sprocket holes 76, as shown in FIG. 16.

To start the operation, the ribbon 74 is fed manually into the punching station 75. After punching the first set of traction holes 76, the ribbon is advanced manually by one frame by threading the traction holes 76 at the beginning of the ribbon 74 on the pin-feed roller 7. From there on the pin-feed assures a synchronized stop and go movement of material through all operations.

The next station consists of rollers 78 which coat with strips of adhesive the top surface of each frame segment in the areas 80a and 80b as shown in FIG. 16. The following station consists of a template feed hopper 79 identical or similar to the punch card feeds and contains a hopper filled with pre-punched templates. Hopper 79 feeds the templates 62 one at a time into a position immediately above the large frame opening 80 in the advancing ribbon. Under the ribbon is located a positioning mechanism 81 which inserts positioning pins 82 through the positioning slots 66 and 67 in the ribbon 74 and the corresponding positioning slots in the template 62. The ribbon moves forward intermittently so that the templates are fed onto the positioning pins 82 while they are stationary. These positioning pins 82 may be designed as a continuous chain mechanism or as a sliding and retracting reciprocating mechanism.

The frame ribbon 74 continues into a bonding oven 83 where the proper temperature effects a permanent bond between the template 62 and the ribbon 74. Throughout the oven 83 are spaced pin-feed rollers, such as 77, thereby assuring the synchronous movement of the ribbon 74 by engaging the traction holes 76.

After leaving the oven 83 the ribbon 74 progresses through the next station where rollers 84 spread adhesive over the bottom surface of the ribbon 74 in areas adjacent to the punched out opening 80 but not expanding into the areas containing the traction holes 76. A roll of opaque plastic or paper sheet material 85 feeds second or base ribbon 86 between the pressure rolls 87 and the advancing ribbon 74 coated on its bottom with adhesive. Due to the pressure feed of a pair of rollers 87, the opaque ribbon 86 and the frame ribbon 74 travel through a heating oven 88 which effects a permanent bond of these two ribbons. The ribbon 86 forms the base 64 of the assembly, and is narrower than ribbon 74 so as not to cover the traction holes 76. Again, additional pin-feed rollers 77 assist the movement of the ribbon 74 through the oven 88.

If a cover 68 is required, a pair of adhesive applicator rollers 89 apply adhesive to the top surface of the appropriate edges of each frame 63 formed in the frame ribbon 74 and on the corresponding edges of the template 62. This adhesive coating constitutes, therefore, two narrow ribbons extending perpendicular to the direction of movement of frame ribbon 74, but they do not encroach on the template, except for a narrow strip on one edge of it. A roll 90 supplies the opaque paper cover ribbon 91 which is fed under the rolls 92 which press the paper ribbon against the adhesively coated surfaces of the frame ribbon 74 and template 62 bonded to it.

These pressure rolls 92 assist the movement of the paper ribbon 91 into an oven 93 while additional pin-feeds assist the movement of the frame ribbon 74 through the same oven. The heat effect of this oven provides a permanent bond between the frame and cover ribbons described above. Whether or not the cover ribbon 91 is included, after leaving the last oven, the combined bonded ribbon 94 is fed onto the slicing rollers 95 which cut off the edges of the frame ribbon 74 containing the traction holes 76. Immediately after the rollers 95 is located a punching station 96 which in one movement cuts off the finished template assembly at the beginning of the bonded ribbon 94 and punches out the corner cut 97 through the bonded layers of base 64, frame 63, and the template 62, and also the paper cover 68, if there is one.

While my invention has been particularly shown and described with reference to the preferred embodiments thereof, it will be understood by those skilled in the art that various changes in form and detail may be made therein without departing from the spirit and scope of the invention as defined in the appended claims.

I claim:

1. In combination:
   a. A document having a plurality of vertical data columns and a column of sequential indicia identifying a plurality of horizontal document rows, each data column comprising a plurality of vertically-spaced marking areas corresponding to respective ones of said sequential indicia and adapted to be manually marked, the marking areas corresponding to vertically adjacent ones of said indicia being located on opposite sides of an imaginary vertical line dividing said data column into two marking columns, and the vertically adjacent marking areas in each marking column being vertically displaced from each other by a distance substantially equal to the vertical dimension of a marking area; the marking areas corresponding to respective ones of said indicia being horizontally aligned in respective ones of said document rows; and
   b. A marking template assembly for use with said document and comprising: a document-supporting base member, a template hinged to one end of said base member and adapted to overlie a document supported on said base member, a plurality of vertical template columns corresponding to said data columns on said document, and two columns of horizontally staggered marking openings in each template column, the positions of said openings corresponding to the positions of the marking areas on said document; said base member being substantially rectangular and further comprising an upstanding rim formed on all four sides thereof to form a cavity for receiving the document and aligning the marking areas on the document with the marking openings in the template.

2. A marking template assembly as defined in claim 1 further comprising an adhesive strip engaging said rim on one end of said base member and one end of said template to form a hinge therebetween.

3. In combination:
   a. A document having a plurality of vertical data columns and a column of sequential indicia identifying a plurality of horizontal document rows, each data column comprising a plurality of vertically-spaced marking areas corresponding to respective ones of said sequential indicia and adapted to be manually marked, the marking areas corresponding to vertically adjacent ones of said indicia being located on opposite sides of an imaginary vertical line dividing said data column into two marking columns, and the vertically adjacent marking areas in each marking column being vertically displaced from each other by a distance substantially equal to the vertical dimension of a marking area; the marking areas corresponding to respective ones of said indicia being horizontally aligned in respective ones of said document rows; and
   b. A marking template assembly for use with said document and comprising: a document-supporting base member, a template hinged to one end of said base member and adapted to overlie a document supported on said base member, a plurality of vertical template columns corresponding to said data columns on said document, and two columns of horizontally staggered marking openings in each template column, the positions of said openings corresponding to the positions of the marking areas on said document; one unhinged corner of said base member having a notch formed therein and the corresponding corner of said template overlying said notch so that a document may be easily inserted into said template assembly.

* * * * *